United States Patent
Chorvath et al.

(10) Patent No.: US 8,404,770 B2
(45) Date of Patent: Mar. 26, 2013

(54) SILICONE ELASTOMERS FOR HIGH TEMPERATURE PERFORMANCE

(75) Inventors: Igor Chorvath, Midland, MI (US); Michael Dipino, North Branford, CT (US); David Lawson, Cardiff (GB); Robert Drake, Penarth (GB); David Shawl, Bay City, MI (US); Jon Degroot, Midland, MI (US); Steve Robson, Vale of Glamorgan (GB); Lauren Tonge, Sanford, MI (US)

(73) Assignee: Dow Corning Corporatioin, Midland, MI (US)

( * ) Notice: Subject to any disclaimer, the term of this patent is extended or adjusted under 35 U.S.C. 154(b) by 292 days.

(21) Appl. No.: 12/663,602

(22) PCT Filed: Jun. 6, 2008

(86) PCT No.: PCT/US2008/066013
§ 371 (c)(1), (2), (4) Date: Dec. 8, 2009

(87) PCT Pub. No.: WO2008/154327
PCT Pub. Date: Dec. 18, 2008

(65) Prior Publication Data
US 2010/0179266 A1    Jul. 15, 2010

Related U.S. Application Data

(60) Provisional application No. 60/933,921, filed on Jun. 8, 2007, provisional application No. 61/014,907, filed on Dec. 19, 2007.

(51) Int. Cl.
*C08K 3/00* (2006.01)

(52) U.S. Cl. ...................... 524/425; 524/431

(58) Field of Classification Search .............. 524/588, 524/425, 431
See application file for complete search history.

(56) References Cited

U.S. PATENT DOCUMENTS

| | | | |
|---|---|---|---|
| 3,070,566 A | * | 12/1962 | Nitzsche et al. ............... 524/80 |
| 3,445,420 A | | 5/1969 | Kookootsedes et al. |
| 3,989,667 A | | 11/1976 | Lee et al. |
| 2007/0249772 A1 | | 10/2007 | Chorvath et al. |

FOREIGN PATENT DOCUMENTS

| | | | |
|---|---|---|---|
| CN | 1976998 A | | 6/2007 |
| EP | 0802233 A2 | | 10/1997 |
| EP | 1024164 A1 | | 8/2000 |
| JP | 55-120657 | * | 9/1980 |
| WO | WO 2006007243 A1 | | 1/2006 |
| WO | WO 2006007268 A1 | | 1/2006 |
| WO | WO 2008154319 A1 | | 12/2008 |

OTHER PUBLICATIONS

English language abstract, JP 55-122657, Sep. 1980.*
English language translation JP 55-120657, Sep. 1980.*
English language abstract for CN 1976998 extracted from the espacenet.com database on Aug. 2, 2011, 24 pages.
PCT International Search Report for PCT/US2008/066001, dated Sep. 11, 2008, 3 pages.
PCT International Search Report for PCT/US2008/066013, dated Sep. 11, 2008, 3 pages.

* cited by examiner

*Primary Examiner* — Margaret Moore
(74) *Attorney, Agent, or Firm* — Howard & Howard Attorneys PLLC

(57) ABSTRACT

Silicone elastomer base compositions containing a stabilizer are disclosed that provide cured silicone elastomers having improved high temperature performance. The stabilizer comprises carbon black, calcium carbonate, iron oxide, and optionally zinc oxide.

12 Claims, No Drawings

US 8,404,770 B2

SILICONE ELASTOMERS FOR HIGH TEMPERATURE PERFORMANCE

RELATED APPLICATIONS

This application claims priority to and all the advantages of International Patent Application No. PCT/US2008/066013, filed on Jun. 6, 2008, which claims priority to U.S. Provisional Patent Application No. 60/933,921, filed on Jun. 8, 2007 and U.S. Provisional Patent Application No. 61/014,907, filed Dec. 19, 2007.

TECHNICAL FIELD

This disclosure relates to silicone elastomer base compositions containing a stabilizer that provide cured silicone elastomers having improved high temperature performance. The stabilizer comprises carbon black, calcium carbonate, iron oxide, and optionally zinc oxide.

BACKGROUND

Automotive applications using silicone rubber are constantly challenged to demonstrate performance improvements. Technology trends result in demands for ever increasing resistance to both heat and chemical exposure. For example, Western Europe continues to exhibit significant growth in turbo diesel passenger cars, at the expense of their gasoline equivalents. In the U.S., a similar growth has been experienced in the small truck market. The service temperatures and pressure of the hoses, especially turbo diesel engine hoses, are thus increasing. Typically, the hoses used in automotive applications have a multilayer structure consisting of fabric reinforcement encapsulated with silicone rubber (classified as VMQ elastomer by the American Society of Test Methods (ASTM)) and lined internally with a layer of fluoroelastorner (FVMQ).

There is a need to improve the heat stability of the silicone elastomers used in automotive applications, and in particular for their use in o-rings, connectors, and in the construction of hoses.

The present inventors have discovered a stabilizer, that when added to silicone elastomer base compositions, provide improved heat aging properties to the cured silicone elastomer.

SUMMARY

This invention relates to a curable silicone elastomer composition comprising:
A) 75-95 wt % of a silicone elastomer base,
B) 1.5-40 wt % of a stabilizer comprising;
  $B^1$) carbon black,
  $B^2$) calcium carbonate,
  $B^3$) iron oxide, and
  $B^4$) optionally zinc oxide,
  wherein the amount by parts of components $B^1$, $B^2$, $B^3$, and $B^4$ used in 100 parts of the stabilizer may vary from 2 to 50 parts,
and
C) 0-3 wt % of a cure agent,
with the proviso the wt % of components A), B), and C) sum to 100 wt %.

In one embodiment, the curable silicone elastomer composition contains a high consistency silicone rubber base comprising;

$A^1$) an organopolysiloxane comprising at least two unsaturated groups and having a viscosity of at least 1000 mPa·s at 25° C.,
$A^2$) a reinforcing filler, and
$A^3$) a filler treating agent.

In another embodiment, the curable silicone elastomer composition contains a liquid silicone rubber base comprising;
$A^1$) an organopolysiloxane comprising at least two unsaturated groups and having a viscosity of at least 1000 mPa·s at 25° C.,
$A^2$) a reinforcing filler,
$A^3$) a filler treating agent,
$A^4$) an organohydrogensiloxane having an average of greater than two silicon bonded hydrogen atoms per molecule, and
$A^5$) a hydrosilylation catalyst.

This disclosure also relates to the cured silicone elastomer compositions and articles of manufacture prepared from them.

DETAILED DESCRIPTION

Component A) in the present disclosure is a silicone elastomer base. As used herein, a "silicone elastomer base" is a silicone composition when subsequently cured or vulcanized, provides a silicone elastomer or rubber. Silicone refers to organopolysiloxanes containing siloxane units independently selected from $(R_3SiO_{0.5})$, $(R_2SiO)$, $(RSiO_{1.5})$, or $(SiO_2)$ siloxy units, where R may be any organic group. These siloxy units can be combined in various manners to form cyclic, linear, or branched structures.

The silicone elastomer base useful in component A) may be selected from any silicone elastomer base known in the art, such as those considered as high consistency silicone rubber bases. The silicone elastomer base may also be selected from those considered to be "liquid silicone rubber" compositions.

In one embodiment of the present disclosure, the silicone elastomer base is a high consistency silicone rubber base. The high consistency silicone rubber base may comprise;
$A^1$) an organopolysiloxane comprising at least two unsaturated groups and having a viscosity of at least 1000 mPa·s at 25° C.,
$A^2$) a reinforcing filler, and
$A^3$) a filler treating agent.

Component $A^1$) is an organopolysiloxane comprising at least two unsaturated groups and having a viscosity of at least 1000 mPa·s at 25° C. The organopolysiloxane may have the average composition of $R^1_a SiO_{(4-a)/2}$. In which $R^1$ is selected from substituted and unsubstituted monovalent hydrocarbon groups and is exemplified by alkyl groups such as methyl, ethyl, and propyl, alternatively each alkyl group contains from 1 to 10 carbon atoms, alternatively each alkyl group is a methyl or ethyl group most preferably each alkyl group is a methyl group; alkenyl groups such as vinyl, allyl, butenyl, and hexenyl; aryl groups such as phenyl; and aralkyls such as 2-phenylethyl. The average value of subscript a is from 1.95 to 2.05.

The organopolysiloxane of $A^1$) has at least two unsaturated groups and a viscosity of at least 1000 mPa·s at 25° C. Typically, the unsaturated groups are alkenyl groups. The alkenyl groups can be bonded in pendant positions, at the terminal positions, or at both positions. The degree of polymerization (dp) of such polymers is in the range of from 200 to 20,000.

The above dp range also includes polymers with a stiff gum-like consistency which have a dp above about 1500 and have a Williams plasticity number (ASTM D926) in the range of from about 30 to 250, and preferably from 95 to 125 (The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C.). Such gum-like polymers are generally used in compression or transfer molds, calendaring, screw-type extruders or the like.

The organopolysiloxane can be a homopolymer or a copolymer or a mixture of such polymers. The siloxy units comprising the organopolysiloxane are exemplified by dialkylsiloxy groups wherein each alkyl group may be the same or different, alkenylmethylsiloxy groups where the alkenyl group contains from 2 to 10 carbon atoms, preferably vinyl or hexenyl, and alkylphenylsiloxy wherein the alkyl groups are as hereinbefore described. Any suitable terminal groups in the organopolysiloxane may be utilised, examples include trialkylsiloxy, and alkenyldialkylsiloxy groups wherein the alkenyl and alkyl groups are as hereinbefore described. Examples of the organopolysiloxane which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and vinyldimethylsiloxy-endblocked dimethylsiloxane-methylphenylsiloxane-vinylmethylsiloxane copolymer.

The reinforcing fillers (A$^2$) of the silicone elastomer base are typically a silica. Many forms of silica are commercially available such as fumed silica, precipitated silica, silica aerogel and silica xerogel. Typically, the reinforcing silica filler has a surface area of at least 100 m$^2$/g and, alternatively, at least 200 m$^2$/g. The reinforcing silica filler may be added in any quantity which provides the desired reinforcement without adversely affecting other properties of the elastomer. Generally, quantities of 5-100 parts of reinforcing silica filler per 100 parts of organosiloxane are useful.

Component (A$^3$) is a filler treating agent (or a mixture of treating agents) comprising an organopolysiloxane comprising at least at least 2 hydroxy or otherwise hydrolysable groups, or a mixture thereof and having an average degree of polymerisation of from 2 to 50. Component (A$^3$) may comprises units of the formula $R^2_a SiO_{(4-a)/2}$ in which $R^2$ is selected from substituted and unsubstituted monovalent hydrocarbon groups and is exemplified by aryl groups such as phenyl groups or alkyl groups such as methyl, ethyl, isopropyl, tertiary butyl and propyl, alternatively each alkyl group contains from 1 to 10 carbon atoms, more preferably each alkyl group is a methyl or ethyl group alternatively each alkyl group is a methyl group. $R^2$ may also be selected from alkenyl groups such as vinyl, allyl and/or hexenyl groups. The average value of subscript a is from 1.95 to 2.05. The at least two hydroxy groups may be terminal hydroxy groups or pendent groups on the chain or both. Each hydrolysable group may be any suitable hydrolysable group which will interact with only "cold" mixing with —OH groups on the hydrophilic filler surface. Typically each hydrolysable group is an alkoxy group having from 1 to 10 carbon atoms or alternatively, if present the each alkoxy group is a methoxy group or ethoxy group. The viscosity of component (A$^3$) is typically between 10 and 1000 mPa·s but may be greater if required. The filler treating agent is typically provided in an amount of from 0.5 to 0.12% by weight of the weight of the filler (component (A$^2$)).

Treating fillers results in improved room temperature mechanical properties of the uncured compositions. Usually fillers (component (A$^2$) are treated in situ using an appropriate treating agent or mixture thereof as described above. However the filler(s) could be pre-treated if desired. Whilst a pre-treatment step is generally avoided as it introduces an additional step into the mixing process, pre-treated surface modified fillers, when prepared, do not clump, and can be homogeneously incorporated into the organopolysiloxane.

The silicone elastomer base may also include extending fillers, such as titanium dioxide, quartz, magnesium oxide, graphite, glass fibers and glass microspheres. The silicone elastomer base may also include pigments, colorants, flame retardants, additional heat stability additives, additives to improve compression set and other additives commonly used in the rubber art.

High consistency silicone rubber bases are known in the art, and many are commercially available. Representative, non-limiting examples include SILASTIC® GP 600 Silicone Rubber, SILASTIC® New GP 600 Silicone Rubber, SILASTIC® HGS 701, and SILASTIC® New HGS 701 Silicone Rubber.

In another embodiment, the silicone elastomer base is a liquid silicone rubber. The liquid silicone rubber may have the following composition;

A$^1$) an organopolysiloxane comprising at least two unsaturated groups and having a viscosity of at least 1000 mPa·s at 25° C., A$^2$) a reinforcing filler, A$^3$) a filler treating agent, A$^4$) an organohydrogensiloxane having an average of greater than two silicon bonded hydrogen atoms per molecule, and A$^5$) a hydrosilylation catalyst.

Components A$^1$, A$^2$, and A$^3$ are the same as described above.

Component (A$^4$) is an organohydrogensiloxane having an average of greater than two silicon bonded hydrogen atoms per molecule. The organohydrogensiloxane contains an average of at least two silicon-bonded hydrogen atoms per molecule, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cylcoalkyls such as cyclohexyl; and aryls such as phenyl and tolyl and/or trifluoroalkyl groups, e.g. trifluoropropyl groups or perfluoroalkyl groups. Such materials are well known in the art. The molecular structure of the organohydrogensiloxane may be linear, linear including branching, cyclic, or network-form or mixture thereof. There are no particular restrictions on the molecular weight of the organohydrogensiloxane, however it is preferable that the viscosity at 25° C. be 3 to 10,000 mPa·s. Furthermore, the amount of component (A$^4$) that is added to the composition is an amount such that the ratio of the number of moles of hydrogen atoms bonded to silicon atoms to the number of moles of alkenyl groups bonded to silicon atoms is in the range of 0.5:1 to 20:1, or alternatively in the range of 1:1 to 5:1.

The silicon-bonded organic groups present in the organohydrogensiloxane can include substituted and unsubstituted alkyl groups of 1-4 carbon atoms that are otherwise free of ethylenic or acetylenic unsaturation. For the purpose of this application "substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulfur atoms; and sulfur atom containing groups such as mercapto groups.

Component ($A^5$) is a hydrosilylation catalyst. Typically the hydrosilylation catalyst chosen may comprise any suitable hydrosilylation catalyst such as a platinum group metal based catalyst selected from a platinum, rhodium, iridium, palladium or ruthenium catalyst. Platinum group metal containing catalysts useful to catalyze curing of the present compositions can be any of those known to catalyze reactions of silicon bonded hydrogen atoms with silicon bonded alkenyl groups. Typically, the platinum group metal for use as a catalyst to effect cure of the present compositions by hydrosilylation is a platinum based catalyst. Representative platinum based hydrosilylation catalysts for curing the present composition include platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as [Rh$(O_2CCH_3)_2]_2$, Rh$(O_2CCH_3)_3$, Rh$_2(C_8H_{15}O_2)_4$, Rh$(C_5H_7O_2)_3$, Rh$(C_5H_7O_2)(CO)_2$, Rh(CO)[Ph$_3$P]$(C_5H_7O_2)$, RhX$^4_3$[(R$^3$)$_2$S]$_3$, (R$^2_3$P)$_2$Rh(CO)X$^4$, (R$^2_3$P)$_2$Rh(CO)H, Rh$_2$X$^4_2$Y$^2_4$, H$_a$Rh$_b$olefin$_c$Cl$_d$, Rh(O(CO)R$^3$)$_{3-n}$(OH)$_n$ where X$^4$ is hydrogen, chlorine, bromine or iodine, Y$^2$ is an alkyl group, such as methyl or ethyl, CO, C$_8$H$_{14}$ or 0.5 C$_8$H$_{12}$, R$^3$ is an alkyl radical, cycloalkyl radical or aryl radical and R$^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as Ir(OOCCH$_3$)$_3$, Ir(C$_5$H$_7$O$_2$)$_3$, [Ir(Z$^4$)(En)$_2$]$_2$), or (Ir(Z$^4$)(Dien)]$_2$, where Z$^4$ is chlorine, bromine, iodine, or alkoxy, En is an olefin and Dien is cyclooctadiene may also be used.

The hydrosilylation catalyst may be added to the present composition in an amount equivalent to as little as 0.001 part by weight of elemental platinum group metal, per one million parts (ppm) of the composition. Typically, the concentration of the hydrosilylation catalyst in the composition is that capable of providing the equivalent of at least 1 part per million of elemental platinum group metal. A catalyst concentration providing the equivalent of 3-50 parts per million of elemental platinum group metal is typically used.

Optional additives for a silicone liquid rubber composition in accordance with the present invention may comprise one or more of the following hydrosilylation catalyst inhibitors, rheology modifiers, pigments, coloring agents, anti-adhesive agents adhesion promoters, blowing agents, flame retardants, electrically and/or thermally conductive fillers, and desiccants.

Any suitable platinum group type inhibitor may be used. One useful type of platinum catalyst inhibitor is described in U.S. Pat. No. 3,445,420, which is hereby incorporated by reference to show certain acetylenic inhibitors and their use. A preferred class of acetylenic inhibitors is the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by reference to show certain olefinic siloxanes, their preparation and their use as platinum catalyst inhibitors. A third type of platinum catalyst inhibitor includes polymethylvinylcyclosiloxanes having three to six methylvinylsiloxane units per molecule.

Compositions containing these catalysts typically require heating at temperatures of 70° C. or above to cure at a practical rate. Room temperature cure is typically accomplished with such systems by use of a two-part system in which the cross-linker and inhibitor are in one of the two parts and the platinum is in the other part. The amount of platinum is increased to allow for curing at room temperature. The optimum concentration of platinum catalyst inhibitor is that which will provide the desired storage stability or pot life at ambient temperature without excessively prolonging the time interval required to cure the present compositions at elevated temperatures. This amount will vary widely and will depend upon the particular inhibitor that is used, the nature and concentration of the platinum-containing catalyst and the nature of the cross-linker. Inhibitor concentrations as low as one mole of inhibitor per mole of platinum will in some instances yield a desirable level of storage stability and a sufficiently short curing period at temperatures above about 70° C. In other cases, inhibitor concentrations of up to 10, 50, 100, 500 or more moles per mole of platinum may be needed. The optimum concentration for a particular inhibitor in a given composition can be determined by routine experimentation.

Typically, the liquid silicone rubber compositions are provided as two part compositions. Prior to use, the final liquid silicone rubber composition as hereinbefore described may be maintained in at least two parts which can be easily mixed together in a final mixing step immediately prior to curing the resultant composition to form an elastomeric solid.

In a typical two part composition a first part hereafter referred to as Part I comprises components $A^1$, $A^2$, $A^5$ and possibly residual treating agent $A^3$. The second part, hereafter referred to as Part II, will comprise component $A^4$ or components $A^4$ and $A^1$. Part I and Part II in a two part composition may be mixed in any suitable ratio in an amount such that the ratio of the number of moles of hydrogen atoms bonded to silicon atoms to the number of moles of alkenyl groups bonded to silicon atoms is in the range of 0.5:1 to 20:1, or alternatively in the range of 1:1 to 5:1. Typically, the cross-linker will be present in the polymer at a level in Part II such that Part I and Part II will be typically mixed in a ratio of from 1:10 to 100:1, alternatively 20:1 to 1:5 or alternatively from 10:1 to 1:2.

Optional additives may be present in either Part I or Part II providing they do not negatively affect the properties of the resulting elastomer. Optional additives include rheological modifiers and adhesion promoters.

The rheological modifiers include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols.

Any suitable adhesion promoter(s) may be incorporated in a composition in accordance with the present invention. These may include for example alkoxy silanes such as aminoalkylalkoxy silanes, epoxyalkylalkoxy silanes, for example, 3-glycidoxypropyltrimethoxysilane and, mercaptoalkylalkoxy silanes and γ-aminopropyl triethoxysilane, reaction products of ethylenediamine with silylacrylates. Isocyanurates containing silicon groups such as 1,3,5-tris (trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

The Stabilizer

Component B) in the present disclosure is a stabilizer. As used herein, "stabilizer" refers to a certain combination of components ($B^1$, $B^2$, $B^3$, and optionally $B^4$) added to a curable silicone elastomer composition, such as those described above, for the purpose of improving either the heat stability or oil resistance of the subsequently cured silicone elastomer composition. The stabilizer component comprises;

$B^1$) carbon black,
$B^2$) calcium carbonate,
$B^3$) iron oxide, and
$B^4$) optionally zinc oxide, each of which are discussed in more detail below.

Component $B^1$ is carbon black. The type and source of carbon black may vary. Representative, non-limiting examples of the carbon black, useful as component ($B^1$) in the present invention can be found in summary articles of this class of materials such as in: Chemical Economics Handbook-SRI International 2005, Carbon Black 731.3000A. Typically, the carbon black is amorphous, having a carbon content of at least 98%, an average particle size of 0.05 micrometers, a specific surface area of at least 44 $m^2/g$. Representative, non-limiting examples of carbon black suitable as component $B^1$ in the present disclosure include; SUPER-JET® Carbon Black (LB-1011) supplied by Elementis Pigments Inc., Fairview Heights, Ill. 62208; SR 511 supplied by Sid Richardson Carbon Co, 3560 W Market Street, Suite 420, Akron, Ohio 44333; and N330, N550, N762, N990 (Degussa Engineered Carbons, Parsippany, N.J. 07054).

Component $B^2$) is calcium carbonate. The type and source of calcium carbonate may vary. Representative, non-limiting examples of the calcium carbonate, useful as component ($B^2$) in the present invention can be found in summary articles of this class of materials such as in: Chemical Economics Handbook-SRI International 2007, Calcium Carbonate 724.6000A. Typically, the calcium carbonate is greater than 99% $CaCO_3$ and the mean particle size is 5-6 micrometers. Representative, non-limiting examples of calcium carbonate suitable as component $B^2$ in the present disclosure include; OMYA BLP® 3 (OMYA, Orgon France).

Component $B^3$) is iron oxide. The type and source of iron oxide may vary. Representative, non-limiting examples of the iron oxide, useful as component ($B^3$) in the present invention can be found in summary articles of this class of materials such as in: Chemical Economics Handbook-SRI International 2008, inorganic Color Pigments 575.3000A. Typically, the iron oxide is a micronised powder containing at least 95% $Fe_2O_3$ having an average particle size of 0.2 micrometers. Representative, non-limiting examples of iron oxide suitable as component $B^3$ in the present disclosure include; Baryferrox® 130 BM (Lanxess Deutschland, GmbH, D-51369 Leverkusen, Germany)

Component $B^4$) is zinc oxide. The type and source of zinc oxide may vary. Representative, non-limiting examples of the iron oxide, useful as component ($B^4$) in the present invention can be found in summary articles of this class of materials such as in: Chemical Economics Handbook-SRI International 2007, Inorganic Zinc Chemicals 798.1000A. Typically, the zinc oxide is at least 99% ZnO and having an average particle size of 0.1 micrometer, and an average surface area of 9.0 $m^2/g$. Representative, non-limiting examples of zinc oxide suitable as component $B^4$ in the present disclosure include;

Kaddox 911 (Horsehead Corp., Monaca Pa. 15061).

The amount of each component used in the stabilizer B) may vary as follows;

$B^1$) carbon black, 2 to 50 parts,
alternatively, 10 to 40 parts,
alternatively, 25 to 40 parts,
or alternatively 30 to 35 parts $B^2$) calcium carbonate, 2 to 50 parts,
alternatively, 10 to 40 parts,
alternatively, 25 to 40 parts,
or alternatively 30 to 35 parts, $B^3$) iron oxide, 2 to 50 parts,
alternatively, 10 to 40 parts,
alternatively, 25 to 40 parts,
or alternatively 30 to 35 parts, $B^4$) zinc oxide, 0 to 50 parts,
alternatively, 1 to 40 parts,
or alternatively 1 to 10 parts wherein parts represent the amount of each component by weight $B^1$, $B^2$, $B^3$, and $B^4$ in 100 parts by weight of the stabilizer.

The amount of the stabilizer (that is the total weight of components $B^1$, $B^2$, $B^3$, and $B^4$) used in the curable silicone elastomer composition may vary from 1.5-40 wt %, alternatively from 5 to 30 wt %, or alternatively from 10 to 20 wt % of the total curable silicone elastomer composition. The amount of the stabilizer required for a particular application may be determined by one skilled in the rubber art based on the selection of the silicone rubber base (A), the selection of the stabilizer composition (B), the heat stability requirements and the process selected for preparing the cured fluorosilicone elastomer. The stabilizer composition may affect the processibility of the silicone rubber base. However, techniques to overcome such factors affecting processibility for added components similar to the present stabilizers are well known. Such techniques include, varying concentration, particle shape, and the surface activity of such components in the silicone elastomer base.

The manner for how each component of the stabilizer is added and mixed in the curable silicone elastomer composition may vary. For example, a mixture of components $B^1$-$B^3$ and optionally $B^4$ may be first made and admixed to the silicone elastomer base composition. Alternatively, each individual component may be added and mixed in any order directly into the curable silicone elastomer composition. To ensure the most uniform and optimum mixing, typically a "masterbatch" of each stabilizer component is prepared by adding the individual stabilizer component with a portion of the silicone base component. The masterbatched stabilizer component may then be added to the silicone elastomer composition. The masterbatch technique is particularly useful for the addition of carbon black, iron oxide, and zinc oxide.

C) The Cure Agent

An optional curing agent is added to the silicone elastomer base containing the stabilizer to effect formation of a cured silicone elastomer. Typically, curing agents are added to the silicone elastomer base component in the high consistency silicone rubber embodiment. Addition of component C) may not be necessary for the liquid silicone rubber embodiment. Typically, the curing agents are organic peroxides which are well-known in the silicone art as curing agents. Specific examples of suitable peroxides which may be used according to the method of the present invention include: 2,5-dimethyl-2,5-di(tert-butylperoxy)hexane; benzoyl peroxide; dicumyl peroxide; t-butyl peroxy O-toluate; cyclic peroxyketal; t-butyl hydroperoxide; t-butyl peroxypivalate; lauroyl peroxide; t-amyl peroxy 2-ethylhexanoate; vinyltris(t-butyl peroxy)silane;

di-t-butyl peroxide, 1,3-bis(t-butylperoxyisopropyl) benzene;

2,2,4-trimethylpentyl-2-hydroperoxide;

2,5-bis(t-butylperoxy)-2,5-dimethylhexyne-3, t-butyl-peroxy-3,5,5-trimethylhexanoate; cumene hydroperoxide; t-butyl peroxybenzoate; and diisopropylbenzene mono hydroperoxide.

The amount of organic peroxide is not critical. A useful amount is in a range of 0.1 to 3 weight percent of the silicone elastomer base containing the stabilizer.

The curable silicone elastomer compositions may also include extending fillers, such as titanium dioxide, quartz, magnesium oxide, graphite, glass fibers and glass microspheres. The silicone elastomer base may also include pigments, colorants, flame retardants, additional heat stability additives and additives to improve compression set.

In one embodiment, the curable silicone elastomer composition contains cerium hydroxide or hydrate as optional component D. The addition of cerium hydroxide or hydrate to silicone elastomer compositions for heat stabilization is known. However, such compositions have limited heat stability, typically to 200° C. The present stabilizer composition (component B) provides thermal stabilities typically in excess of 200° C. when used in conjunction with conventional heat stabilizers such as cerium hydroxide or hydrate. Cerium hydroxide or hydrate useful as component DA[4] include those cerium compounds having the formula $Ce(OH)_4 \cdot xH_2O$ [CAS registry number 12014-56-1]. The amount of cerium hydroxide or hydrate may vary, but typically ranges from 0.1 to 10 weight % of the silicone elastomer composition. To ensure the most uniform and optimum mixing, typically a "masterbatch" of the cerium hydroxide or hydrate component is prepared by mixing it with a portion of the silicone base or polydiorganopolysiloxane component. The masterbatched cerium hydroxide or hydrate component may then be added to the silicone elastomer composition. Such masterbatched compositions that are commercially available and useful in the present compositions include SILASTIC® HT-1 Modifier (Dow Corning Corporation, Midland, Mich.).

The temperature range for curing the silicone elastomer base may be room temperature or above. A preferred temperature range is 50° C. to 250° C. The temperature range should be sufficient to activate the catalyst used.

A silicone elastomer or rubber may be produced by mixing the silicone base composition detailed above, forming the composition to a desired configuration, and vulcanizing to yield a silicone elastomer.

The silicone elastomeric composition may be formed to the desired configuration by suitable methods such as compression molding, injection molding, transfer molding, calendering and extruding.

After forming to the desired configuration, the formed silicone elastomer is vulcanized. When the silicone elastomer composition contains organic peroxide vulcanizing agent, the composition is vulcanized by heating to a temperature sufficiently high to activate the organic peroxide catalyst. When molding, the temperature is typically from 100° C. to 180° C. for times of 15 minutes or less. When curing in hot air, as in an extruding operation, the air temperature may be as high as 300° C. with exposure times as short as 10 to 60 seconds.

The silicone elastomer exhibits improved retention of physical properties after aging at elevated temperatures.

In one embodiment, the cured silicone elastomer has a tensile strength of at least 7 MPa and an elongation of at least 200%.

In one embodiment, the tensile strength of the cured silicone elastomer decreases by no more than 25 percent upon heat aging of the cured silicone elastomer for 7 days at 225° C.

The cured elastomer compositions are useful in a variety of applications to construct various articles of manufacture illustrated by but not limited to; O-rings, gaskets, connectors, seals, liners, hoses, tubing, diaphragms, boots, valves, belts, blankets, coatings, rollers, molded goods, extruded sheet, caulks, and extruded articles, for use in applications areas which include but not are limited to transportation including automotive, watercraft, and aircraft; chemical and petroleum plants; electrical: wire and cable: food processing equipment; nuclear power plants; aerospace; medical applications; and the oil and gas drilling industry and other applications

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Materials Used

| Material name | Description |
|---|---|
| New GP 600 | A silicone rubber base marketed by Dow Corning Corporation (Midland, MI) as Silastic ® New GP 600. |
| New HGS 701 | A silicone rubber base marketed by Dow Corning Corporation (Midland, MI) as Silastic ® New HGS 701. |
| HT-1 MB | HT-1 MB is a masterbatch of 50% cerium hydroxide in a dimethyl silicone rubber carrier and is marketed by Dow Corning Corporation (Midland, MI) as Silastic ® HT-1 Modifier. |
| FeO3 MB | S 2400 Red 2 MB - a masterbatch of 50% iron oxide, as Bayferrox 130 BM Red Iron Oxide Pigment (Lanxess Corp.), in a dimethyl silicone rubber carrier and is marketed by Dow Corning Silastic ® S2400 Red 2 Colour Masterbatch. |
| Dicup 40C | Dicumyl peroxide, 40% on CaCO3 GEO Specialty Chemicals |
| ZnO | Zinc oxide as Kaddox 911 (Horsehead Corp., Monaca PA 15061) |
| CB | Carbon black used as provided as SUPERJET ® Carbon Black (LB-1011) from Elementis Pigments Inc., Fairview Heights, IL 62208. |
| CaCO3 | Calcium carbonate ($CaCO_3$) as OMYA BLP ® 3 (OMYA, Orgon France) |

Formulations

All test formulations included 100 parts of either "New GP 600" or "New HGS 701", 1.0 parts "HT-1" and 1.5 parts Dicup 40C. Formulations were made containing various combinations of "Kadox 911", "LB-1011", "S 2400 Red 2 MB", and "BLP-3". Baselines, which did not include any of the additives, were also made so the effects of the additives could be measured.

Compounding

All components were weighed using a 2 place laboratory balance to within 2% of there target weight. All test formulations were compounded using a laboratory two roll mill.

The mill was unheated and the temperature of all batches made was kept below 50° C. during mixing. The main component of all the test formulations, either "New GP 600" or "New HGS 701" depending on the formulation, was added first and allowed to band on the faster roll. The HT-1 was added first followed by all additives for the particular formulation and allowed to mix until incorporated. The material was then cut from the roll, rolled up and fed back through the rolls to hand again around the roll. The material was then cut off, fed through, and allowed to band the same way 9 more times. The material was then fed back into the mill again and allowed to band. The "Dicup 40C" was then added and allowed to mix until incorporated. The material was then cut from the roll, rolled up and fed back through the rolls to band again around the roll. The material was then cut off, fed through, and allowed to band the same way 9 more times. The material was then passed through the mill using a wider nip gap to obtain a continuous sheet of material approximately 0.100" thick more suitable for molding.

Molding

The apparatus used for molding test slabs consisted of two 12"×12"×0.040" aluminum backer plates, both covered with apiece of PTFE fiber reinforced film, and a 12"×12" steel chase with a cavity measuring 10"×10"×0.075". The material, which had previously been sheeted off the mill, was weighed to assure a proper fill weight for the chase. The material was first cold pressed and then placed in a press heated to 170 C for a duration of 10 minutes at a pressure of 2,100 psi. At the end of the 10 minutes the material would promptly be removed from the chase and allowed to cool on a cold steel bench. After cooling the identification number and molding conditions were written on the slabs and a light coating of talc dusted over the surface to prevent the slab from sticking to itself or other slabs during testing.

Test Methods

All materials were post cured for 4 hours at a temperature of 200° C. in a circulating hot air oven before testing Hardness Dow Corning Corporate Test Method 0099, based on ASTM D 2240

Tensile strength, Elongation, Modulus

Dow Corning Corporate Test Method 0137A, based on ASTM D 412

Tear Strength

Dow Corning Corporate Test Method 1313, based on ASTM D 624

Heat Aging

Test specimens were prepared as for normal testing. They were then measured for thickness and hung by end in a preheated circulating hot air oven for the duration of the specified test period. Specimen were spaced far enough apart to assure good airflow around all sides of each specimen. Specimens were then removed, allowed to cool, and tested within 16-48 hrs according to the tensile and tear methods using the pre-aged thickness for all property calculations.

| Formulation HCR's used in TCH construction | Initials | | | | | Aged | | | | | Change | | | | | |
|---|---|---|---|---|---|---|---|---|---|---|---|---|---|---|---|---|
| | Tensile MPa | EB % | Mod 30 MPa | Mod 100 MPa | Duro ShA | Tensile MPa | EB % | Mod 30 MPa | Mod 100 MPa | Duro ShA | Tensile % | EB % | Mod 30 % | Mod 100 % | Duro pts | Weight loss % |
| 7 days/225 C. | | | | | | | | | | | | | | | | |
| New GP 600 | 10.47 | 470 | 1.03 | 1.79 | 60 | 6.03 | 354 | 1.08 | 1.85 | 61 | −42 | −25 | 5 | 3 | 1 | 1.27 |
| New HGS 701 | 10.22 | 294 | 1.84 | 3.42 | 73 | 6.85 | 195 | 2.14 | 4.05 | 75 | −33 | −34 | 16 | 18 | 2 | 1.87 |
| New GP 600, 2 phr CB, 4 phr FeO3 | 1.16 | 471 | 1.07 | 1.97 | 61 | 7.49 | 389 | 1.20 | 2.07 | 64 | −33 | −17 | 12 | 5 | 3 | 1.93 |
| New HGS 701, 2 phr CB, 4 phr FeO3 | 10.36 | 282 | 1.88 | 3.59 | 73 | 7.50 | 212 | 2.22 | 4.18 | 76 | −28 | −25 | 18 | 17 | 3 | 2.13 |
| New GP 600, 2 phr CB, 4 phr FeO3, 2 phr CaCO3 | 10.82 | 454 | 1.11 | 1.96 | 61 | 7.25 | 384 | 1.24 | 2.14 | 65 | −33 | −15 | 12 | 9 | 4 | 2.19 |
| New HGS 701, 2 phr CB, 4 phr FeO3, 2 phr CaCO3 | 7.69 | 224 | 1.93 | 3.56 | 73 | 6.96 | 188 | 2.34 | 4.19 | 77 | −10 | −16 | 21 | 18 | 4 | 2.97 |
| New GP 600, 4 phr CB, 4 phr FeO3, 4 phr CaCO3 | 10.64 | 440 | 1.19 | 2.13 | 63 | 7.24 | 361 | 1.38 | 2.40 | 67 | −32 | −18 | 16 | 13 | 3 | 2.90 |
| New HGS 701, 4 phr CB, 4 phr FeO3, 4 phr CaCO3 | 9.30 | 242 | 2.09 | 4.01 | 74 | 7.04 | 182 | 2.66 | 4.64 | 79 | −24 | −24 | 27 | 16 | 5 | 3.93 |
| New GP 600, 3.5 phr ZnO, 3.5 phr CB, 1.5 phr CaCO3 | 8.92 | 379 | 1.21 | 2.23 | 63 | 6.92 | 337 | 1.46 | 2.60 | 68 | −22 | −11 | 21 | 17 | 4 | 3.18 |
| New HGS 701, 3.5 phr ZnO, 3.5 phr CB, 1.5 phr CaCO3 | 8.16 | 218 | 2.13 | 4.04 | 75 | 5.96 | 146 | 2.70 | 4.78 | 79 | −27 | −33 | 27 | 18 | 4 | 3.64 |
| 7 days/250 C. | | | | | | | | | | | | | | | | |
| New GP 600 | 10.47 | 470 | 1.03 | 1.79 | 60 | 5.34 | 307 | 1.27 | 2.73 | 64 | −49 | −35 | 23 | 52 | 4.7 | 1.27 |
| New HGS 701 | 10.22 | 294 | 1.84 | 3.42 | 73 | 6.31 | 152 | 2.60 | 5.28 | 79 | −38 | −48 | 41 | 54 | 6.2 | 1.87 |
| New GP 600, 2 phr CB, 4 phr FeO3 | 11.16 | 471 | 1.07 | 1.97 | 61 | 5.19 | 333 | 1.24 | 3.30 | 65 | −53 | −29 | 16 | 68 | 4.1 | 1.93 |
| New HGS 701, 2 phr CB, 4 phr FeO3 | 10.36 | 282 | 1.88 | 3.59 | 73 | 6.15 | 158 | 2.60 | 5.54 | 79 | −41 | −44 | 38 | 54 | 5.7 | 2.13 |
| New GP 600, 2 phr CB, 4 phr FeO3, 2 phr CaCO3 | 10.82 | 454 | 1.11 | 1.96 | 61 | 5.19 | 318 | 1.32 | 4.14 | 65 | −52 | −30 | 19 | 112 | 4.3 | 2.19 |
| New HGS 701, 2 phr CB, 4 phr FeO3, 2 phr CaCO3 | 7.69 | 224 | 1.93 | 3.56 | 73 | 4.33 | 87 | 2.74 | 6.96 | 81 | −44 | −61 | 42 | 96 | 7.7 | 2.97 |
| New GP 600, 4 phr CB, 4 phr FeO3, 4 phr CaCO3 | 10.64 | 440 | 1.19 | 2.13 | 63 | 5.00 | 254 | 1.66 | 6.33 | 70 | −53 | −42 | 39 | 197 | 6.2 | 2.90 |
| New HGS 701, 4 phr CB, 4 phr FeO3, 4 phr CaCO3 | 9.30 | 242 | 2.09 | 4.01 | 74 | 5.04 | 120 | 3.38 | 9.49 | 84 | −46 | −50 | 62 | 137 | 9.8 | 3.93 |
| New GP 600, 3.5 phr ZnO, 3.5 phr CB, 1.5 phr CaCO3 | 8.92 | 379 | 1.21 | 2.23 | 63 | 4.15 | 191 | 1.67 | 6.37 | 71 | −53 | −50 | 38 | 186 | 7.9 | 3.18 |

| Formulation HCR's used in TCH construction | Initials | | | | | Aged | | | | | Change | | | | | |
|---|---|---|---|---|---|---|---|---|---|---|---|---|---|---|---|---|
| | Tensile MPa | EB % | Mod 30 MPa | Mod 100 MPa | Duro ShA | Tensile MPa | EB % | Mod 30 MPa | Mod 100 MPa | Duro ShA | Tensile % | EB % | Mod 30 % | Mod 100 % | Duro pts | Weight loss % |
| New HGS 701, 3.5 phr ZnO, 3.5 phr CB, 1.5 phr CaCO3 | 8.16 | 218 | 2.13 | 4.04 | 75 | 4.35 | 92 | 3.24 | 7.77 | 83 | −47 | −58 | 52 | 92 | 8.4 | 3.64 |

The invention claimed is:

1. A curable silicone elastomer composition comprising:
   A) 75-95 wt % of a silicone elastomer base wherein the silicone elastomer base has a degree of polymerization above 1500,
   B) 25 wt % of a stabilizer comprising;
      $B^1$) carbon black,
      $B^2$) calcium carbonate,
      $B^3$) iron oxide, and
      $B^4$) optionally zinc oxide,
      wherein the amount by parts of components $B^1$, $B^2$, $B^3$, and $B^4$ used in 100 parts of the stabilizer may vary from 2 to 50 parts, and
   C) 0-3 wt % of a cure agent,
with the proviso that the wt % of components A), B), and C) sums to 100 wt %.

2. The curable silicone elastomer composition of claim 1 wherein the silicone elastomer base is a high consistency silicone rubber base.

3. A curable silicone elastomer composition comprising:
   A) 75-95 wt % of a silicone elastomer base wherein the silicone elastomer base is a liquid silicone rubber comprising;
      $A^1$) an organopolysiloxane comprising at least two unsaturated groups and having a viscosity of at least 1000 mPa·s at 25° C.,
      $A^2$) a reinforcing filler,
      $A^3$) a filler treating agent,
      $A^4$) an organohydrogensiloxane having an average of greater than two silicon bonded hydrogen atoms per molecule, and
      $A^5$) a hydrosilylation catalyst,
   B) 25 wt % of a stabilizer comprising;
      10 to 40 parts $B^1$) carbon black,
      10 to 40 parts $B^2$) calcium carbonate,
      10 to 40 parts $B^3$) iron oxide, and
      $B^4$) optionally zinc oxide,
      wherein the amount by parts of components $B^1$, $B^2$, $B^3$, and $B^4$ are used in 100 parts of the stabilizer, and
   C) 0-3 wt % of a cure agent,
with the proviso that the wt % of components A), B), and C) sums to 100 wt %.

4. A process for preparing a cured silicone elastomer comprising;
   i) forming a mixture of the composition of claim 1 to a configuration, and
   ii) vulcanizing the configured mixture,
to produce the cured silicone elastomer.

5. The cured silicone elastomer prepared by the process of claim 4.

6. The cured silicone elastomer of claim 5 wherein the cured silicone elastomer has a tensile strength of at least 7 MPa and an elongation of at least 200%.

7. The cured silicone elastomer of claim 5 wherein the tensile strength of the cured silicone elastomer decreases by no more than 25 percent upon heat aging of the cured silicone elastomer for 7 days at 225° C.

8. The cured silicone elastomer of claim 5 wherein;
   the tensile strength of the cured silicone elastomer decreases by no more than 25 percent upon heat aging of the cured silicone elastomer for 7 days at 225° C., and
   the elongation of the cured silicone elastomer decreases by no more than 25 percent upon heat aging the cured silicone elastomer for 7 days at 225° C.

9. An article of manufacture comprising the cured silicone elastomer of claim 5.

10. The article of manufacture of claim 9 wherein said article is selected from O-rings, gaskets, seals, liners, hoses, tubing, diaphragms, boots, valves, belts, blankets, coatings, rollers, molded goods, extruded sheet, caulks, and extruded articles.

11. A method for improving the heat stability or heat resistance of a silicone elastomer comprising:
   I) mixing a stabilizer with a silicone elastomer base, wherein the stabilizer is present in an amount of 1.5-40 wt % of a silicone composition including the silicone elastomer base and wherein the silicone elastomer base has a degree of polymerization above 1500, said stabilizer comprising;
      $B^1$) carbon black,
      $B^2$) calcium carbonate,
      $B^3$) iron oxide, and
      $B^4$) optionally zinc oxide,
   II) vulcanizing the silicone elastomer base containing the stabilizer.

12. The method of claim 11 wherein the silicone elastomer base is a high consistency silicone rubber base.

* * * * *

UNITED STATES PATENT AND TRADEMARK OFFICE
CERTIFICATE OF CORRECTION

PATENT NO. : 8,404,770 B2
APPLICATION NO. : 12/663602
DATED : March 26, 2013
INVENTOR(S) : Igor Chorvath et al.

Page 1 of 1

It is certified that error appears in the above-identified patent and that said Letters Patent is hereby corrected as shown below:

On the Title Page, Item (73) Assignee: delete "Dow Corning Corporatioin, Midland, MI (US)" and insert --Dow Corning Corporation, Midland, MI (US)--.

Signed and Sealed this
Twenty-sixth Day of November, 2013

Margaret A. Focarino
*Commissioner for Patents of the United States Patent and Trademark Office*